P. HILL.
Horse Hay Fork.
No. 45,324.            Patented Dec. 6, 1864.
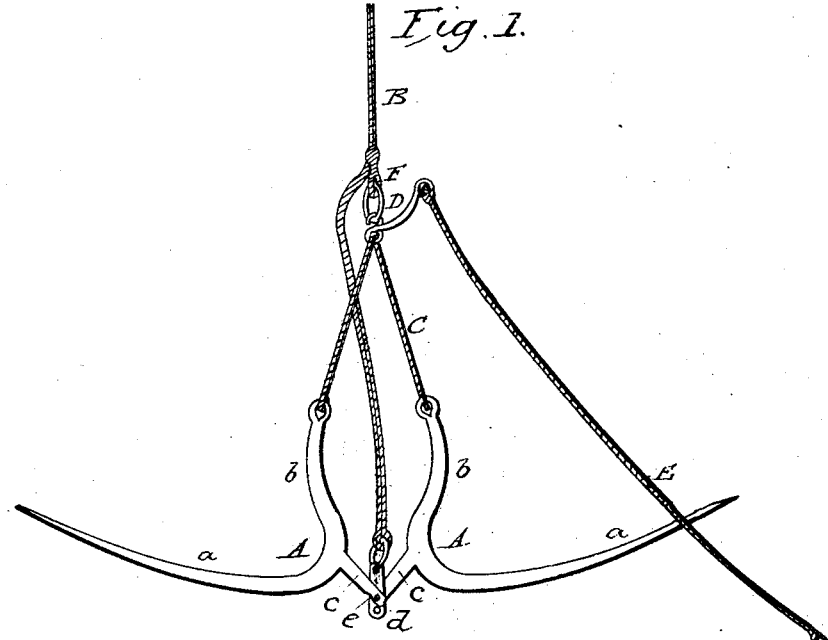
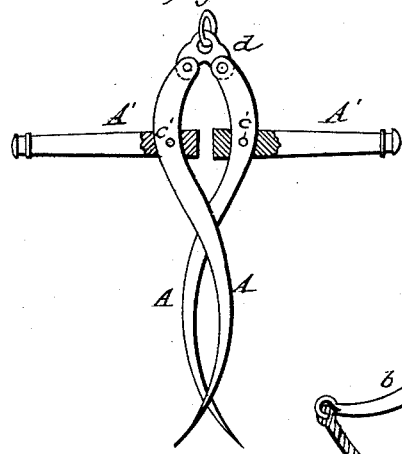
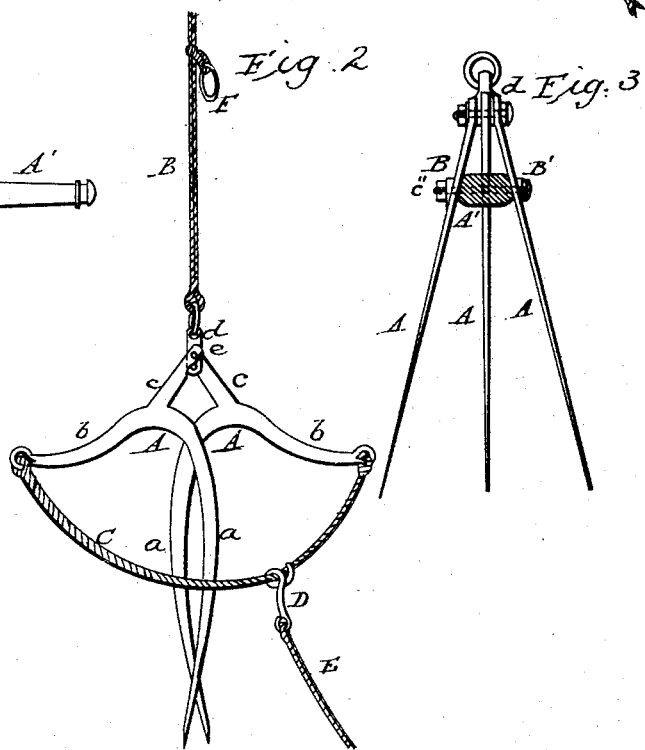
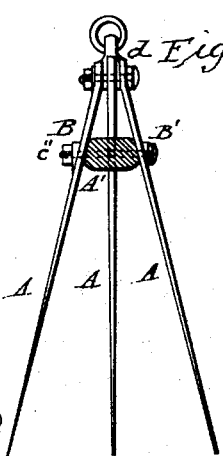

UNITED STATES PATENT OFFICE.

PORTER HILL, OF MILLPORT, NEW YORK.

IMPROVEMENT IN HORSE HAY-FORKS.

Specification forming part of Letters Patent No. 45,324, dated December 6, 1864.

*To all whom it may concern:*

Be it known that I, PORTER HILL, of Millport, in the county of Chemung and State of New York, have invented a new and Improved Horse Hay-Fork; and I do hereby declare that the following is a full, clear, and exact description thereof, which will enable those skilled in the art to make and use the same, reference being had to the accompanying drawings, making a part of this specification, in which—

Figure 1 is a side view of my invention in a working condition, or while being elevated with its load; Fig. 2, a side view of the same after the load is discharged. Figs. 3 and 4 illustrate a modification of my improved fork, showing the manner in which it is adapted to elevate barley or straw.

Similar letters of reference indicate like parts.

This invention consists in the employment or use of two tines connected by a toggle, and having ropes applied to them in such a manner that the tines may be readily inserted in the hay to receive its load, and the latter, when the fork is elevated to the desired position, discharged from the fork with the greatest facility.

A A represent two tines, curved, as shown, so that the lower parts, $a$, which form the tines proper, will be but slightly bent, the other parts, $b$, which serve as tangs, being nearly at right angles with $a$. The tines have each an arm, $c$, projecting from them at the junction of the two parts $a\ b$, and these are connected together at their outer ends and to a link, $d$, by means of a rivet, $e$.

B is the hoisting-rope, which is attached to the link $d$; and C is a rope, which is attached to the ends of the tangs $b\ b$, and has a hook, D, fitted on it, to which a cord, E, is connected. The hoisting-rope B has a ring, F, attached to it.

When the fork hangs suspended from the lower end of the hoisting-rope B the tines A A will have the position shown in Fig. 2, the parts $a\ a$ being in contact, and while in this position said parts are thrust into the hay by the operator pressing on the arms $c\ c$ with his foot. The rope C is then raised and the hook D fitted in the ring F on the hoisting-rope, and the horse being started the pull of the rope B will be on the rope C, and the tangs $b\ b$ will be drawn toward each other and the parts $a\ a$ distended, as shown in Fig. 1, so that the load will be held by the tines while the fork is being elevated. The hoisting-rope B is arranged in the usual way, passing over a pulley in the upper part of the barn, and down under a pulley on the floor of the barn. When the fork is elevated to the desired height, or over the spot where the load is to be discharged, the operator pulls the cord E, and thereby draws the hook D out of the ring F, so that the fork will be suspended from the end of the hoisting-rope and the tines instantly assume the position shown in Fig. 2, the arms $c\ c$ operating as a toggle, and the load will drop from the fork.

Inasmuch as straw is not bunched as readily as hay, it is necessary to employ more than two tines to elevate the same. Figs. 3 and 4 illustrate the manner in which my invention is modified to meet this requirement. For each of the tines A illustrated in Figs. 1 and 2, three tines A A A, Fig. 3, are employed, the fork thus carrying six tines in all. The tines, when thus employed, are adapted to move with arms or handles A' A', three tines being secured to each arm A', one passing through the arm and the others held against the sides thereof by the band B' and bolt $c'$, and the link $d$ constituting the common point about which the arms A' and tines A turn. As thus employed, the shape of the tines may be varied, if desired, and the rope C, instead of being connected directly to the ends of the tines, is attached to the ends of the arms A'. The operation is the same as that already described.

This fork may be very cheaply constructed. It is simple, not liable to get out of repair, and may be operated with the greatest facility.

I claim as new and desire to secure by Letters Patent—

A horse hay-fork the tines of which are connected by a toggle to which the hoisting-rope B is attached, in combination with the rope C, provided with the hook D, and the ring F on the hoisting-rope, all arranged substantially as described.

PORTER HILL.

Witnesses:
H. W. SEAMAN,
H. SEAMAN.